(12) United States Patent
Grammas et al.

(10) Patent No.: US 8,973,002 B1
(45) Date of Patent: Mar. 3, 2015

(54) BUSINESS RULES BATCH PROCESSOR

(71) Applicant: FMR LLC, Boston, MA (US)

(72) Inventors: Constantine Grammas, Cranston, RI (US); James L. Kelly, Jr., North Attleborough, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/027,752

(22) Filed: Sep. 16, 2013

(51) Int. Cl.
G06F 9/46 (2006.01)
G06F 15/173 (2006.01)
G06Q 10/06 (2012.01)

(52) U.S. Cl.
CPC ..................................... *G06Q 10/06* (2013.01)
USPC ........... 718/101; 718/100; 718/102; 718/104; 709/223; 709/224; 709/226

(58) Field of Classification Search
None
See application file for complete search history.

(56) References Cited

U.S. PATENT DOCUMENTS

| | | | |
|---|---|---|---|
| 2007/0234363 A1* | 10/2007 | Ferrandiz ...................... | 718/101 |
| 2008/0320476 A1* | 12/2008 | Wingard et al. .............. | 718/101 |
| 2009/0037914 A1* | 2/2009 | Chagoly et al. ............... | 718/101 |
| 2009/0076876 A1* | 3/2009 | Knowles et al. .................. | 705/8 |
| 2009/0178042 A1* | 7/2009 | Mehta et al. .................. | 718/101 |
| 2010/0153952 A1* | 6/2010 | Linder .......................... | 718/101 |
| 2010/0281307 A1* | 11/2010 | Ng .................................. | 714/40 |
| 2011/0055798 A1* | 3/2011 | Kraft et al. .................... | 717/100 |
| 2011/0161959 A1* | 6/2011 | Sharon et al. ................. | 718/101 |
| 2012/0060171 A1* | 3/2012 | Bobroff et al. ................ | 718/105 |
| 2012/0101867 A1* | 4/2012 | Zgardovski et al. ......... | 705/7.15 |
| 2012/0137297 A1* | 5/2012 | Hoprich ........................ | 718/101 |
| 2012/0204180 A1* | 8/2012 | Santoli et al. ................. | 718/101 |
| 2013/0219385 A1* | 8/2013 | Geibel et al. ..................... | 718/1 |

OTHER PUBLICATIONS

Wheeler, "Getting Started with Spring Batch 2.0", Mar. 25, 2009, pp. 1-6, http://java.dzone.com/articles/getting-started-spring-batch.*

* cited by examiner

*Primary Examiner* — Charles Swift

(74) *Attorney, Agent, or Firm* — Gesmer Updegrove LLP

(57) ABSTRACT

A business rules batch processor is provided that includes a business rules manager that sends a plurality of pending requests to a rules database for processing. A business rules orchestrator receives statuses of the pending requests from the business rules manager. The business rules orchestrator manages the batch processing of the pending requests by assessing the rules database usage and job requirements of the pending requests.

16 Claims, 2 Drawing Sheets

BUSINESS RULES BATCH PROCESSOR

BACKGROUND OF THE INVENTION

The invention is related to the field of business management tools, and in particular to a business rules orchestrator for execution and orchestration of business rules in a batch environment.

Although typically thought of as an artifact of legacy computing, batch processes remain vital to today's real-time enterprises. Behind the real time systems that power the real time enterprise, such as customer order fulfillment, account management, supply chain scheduling and optimization, or financial trading systems, are regularly-updated back office business systems. Today, batch processes remain essential for one key reason: it is simply not efficient to regenerate a complete forecast or business plan every time the business processes a single event such as an incoming customer order. Real time enterprises do require systems that can support dynamic processes; however, it is best to reserve that capacity for aspects of data or processes for the most volatile high-velocity markets.

Nonetheless, while the need for batch processes hasn't changed, the nature of batch processing today has certainly evolved. For instance, while scheduled batch processes remain relevant for time-related processes such as end-of-period reporting, real time enterprises may require more flexibility for adapting to temporary or permanent market fluctuations, or to planned or unplanned changes in underlying IT infrastructure. Companies are faced with new requirements for managing compliance with increasingly stringent regulatory mandates. This may dictate the need for policy-driven workflows with the capability for dynamically triggering batch processes when specific scenarios are met.

SUMMARY OF THE INVENTION

According to one aspect of the invention, there is provided a business rules batch processor. The business rules batch processor includes a business rules manager that sends a plurality of pending requests to a rules database for processing. A business rules orchestrator receives statuses of the pending requests from the business rules manager. The business rules orchestrator manages the batch processing of the pending requests by assessing the rules database usage and job requirements of the pending requests.

According to another aspect of the invention, there is provided a method for batch processing of business rules. The method includes sending a plurality of pending requests from a business rules manger to a rules database for processing. Also, the method includes receiving statuses of the pending requests from the business rules manager to a business rules orchestrator. The business rules orchestrator manages the batch processing of the pending requests by assessing the rules database usage and job requirements of the pending requests.

DETAILED DESCRIPTION OF THE INVENTION

The invention involves a novel business rules orchestrator for managing the execution and orchestration of business rules in a batch environment. The invention implemented to integrate and execute with any BRMS (business rules management system) in a batch process. Moreover, the invention can be implemented on any operating system platform as well as work with all database systems.

Figure 1:
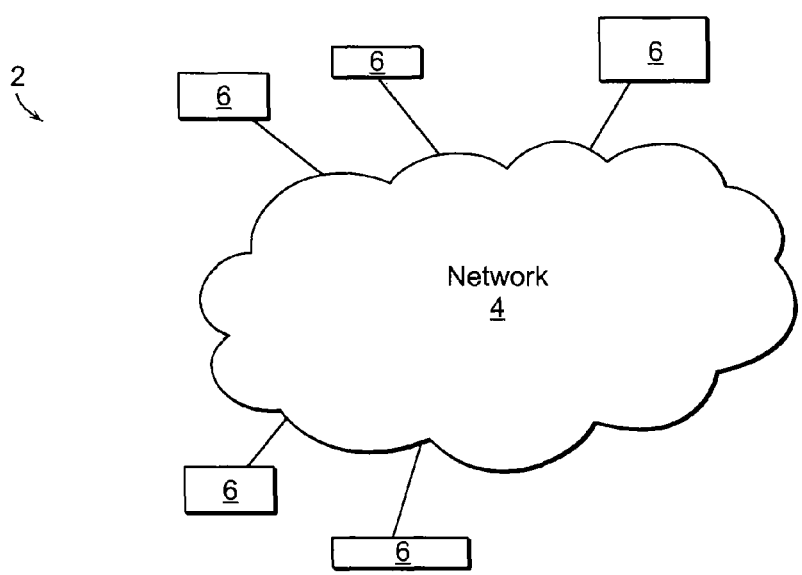
FIG. 1 is a schematic diagram illustrating network architecture used by the invention.

FIG. 1 is a schematic diagram illustrating a cloud network architecture 2 used in accordance with the invention. A cloud architecture 2 include a cloud network 4 having a plurality of personal computing devices 6, such as personal computers, smartphones, tablets, or the like, coupled to the network. The personal computing devices communicate with the cloud network 4 using standard communication protocols such as TCP/IP or the like. The cloud network 4 can include of one or more server computing systems. The invention utilizes a cloud computing model as service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud-based computing resource is thought to execute or reside somewhere on the cloud network 4, which may be an internal corporate network or the public Internet. From the perspective of an application developer or information technology administrator, cloud computing enables the development and deployment of applications that exhibit scalability (e.g., easily and dynamically increase or decrease resource utilization as needed), performance (e.g., execute efficiently and fast), and reliability (e.g., never, or at least rarely, fail), all without any regard for the nature or location of the underlying infrastructure. The invention executes in one or more cloud resources in the cloud network 4.

Figure 2:
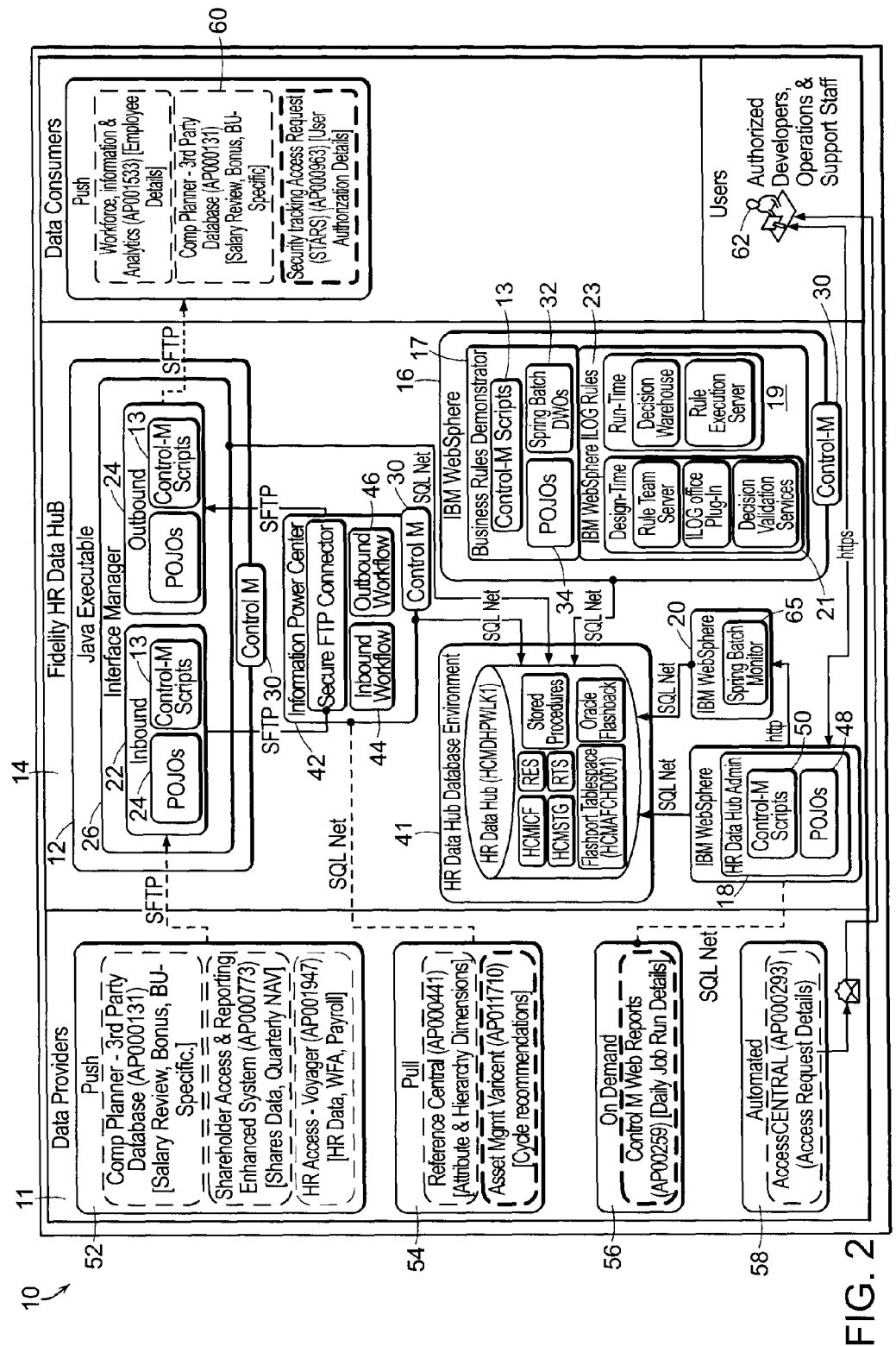
FIG. 2 shows the exemplary example of the system architecture of the invention.

FIG. 2 shows the system architecture 10 used in accordance with an exemplary embodiment of the invention. In particular, the system architecture 10 includes data providers 11, a data hub 14, and data consumers 60. The system architecture 10 shows the various data providers 11 that provide essential data to the data hub 14. The data hub 14 is a centralized location where data is stored as well as processing occurs for requests that are received by data providers 11 or authorized developers/users 62. The data hub 14 includes push data providers 52 who data pushed thru the data hub for further processing, such as $3^{rd}$ party databases, shareholder access reporting system, or HR access. The data hub 14 subscribes to various data providers 11; whenever new content is available from the push providers 52, the push providers 52 push that information out to the data hub 14 using STFP. The SFTP is a network protocol that provides file access, file transfer, and file management functionalities over any reliable data stream. It was designed by the Internet Engineering Task Force (IETF) as an extension of the Secure Shell protocol (SSH) version 2.0 to provide secure file transfer capability, but is also intended to be usable with other protocols.

The data providers 11 include pull data providers 54 where the initial request for data originates from the data hub 14, and then is responded to by the by one of the pull data providers 54. Many times the pull data providers 54 include repository databases are stored off-site data. The pull providers 54 sent their data to the data hub 14 using SQL Net, which is s a plain-text configuration file that contains the information like tracing options, encryption, route of connections, external naming parameters on how both Oracle server and Oracle client have to use SQL*Net opportunities. Other network communication protocols can be used as well. Also, the data providers 11 include on demand data providers 56 that provide specific Control-M web reports for later referencing by the data hub 14. The Control M-web reports can include daily job runtime details and other job specific information, and are provided to the data hub 14 using the SQL Net protocol or the like.

Control-M 30 is a workload automation or batch scheduling software that was originally written for mainframe computers, but is also available for distributed computing platforms including Unix, Windows, Linux, and OpenVMS environments. Moreover, Control-M can schedule workloads on a daily, weekly or monthly interval. It can also be used to respond to trigger events such as the appearance of a file, being called by a third party application through an API, or invocation on demand through Java or Web services. It is designed for automation of various functions in the enterprise including traditional IBM mainframe OS/MVS JCL, batch files, shell scripts as well as other routine functions such as invoking database stored procedures, invoking and using Web services and handling file transfers inside and outside the organization. Control-M can be integrated with applications such as SAP and Oracle's PeopleSoft, to act as a scheduling organizer in these platforms.

The data hub 14 includes an interface manager 12, Information PowerCenter 42, a hub database 41, and a rules manager 16. The interface manager 12 is a Java executable that is platform independent. The Java computer programming language requires a virtual machine, or a "virtual CPU" which runs all of the code that is written for the language. This enables the same executable binary to run on all systems, supporting the Java software, through the use of a Java Virtual Machine (JVM). Java executables do not run natively on the operating system; that is, neither Windows nor Linux execute Java programs directly. The interface manager 12 receives pushed data from the push data providers 52 via SFTP. The interface manager 12 includes an inbound module 22 and an outbound module 24. The inbound module 22 manages the flow of data being received by the pushed data providers 52 and the outbound module 24 manages the flow of data being sent to data consumers 60. The interface manager 12 determines whether to store the incoming information to the hub database 41 or directly to the data consumers 60. This requires using Control-M 30 functionality allowing for batch scheduling and processing of the incoming and outgoing information from the interface manager 12.

The interface manager 12 sends all incoming information to the Information Power Center 42 by first authentication via SFTP. If the Information Power Center 42 determines if the interface manager 12 has the proper credentials, the Information Power Center 42 determines the further steps in processing the incoming data. The Information Power Center 42 includes a Secure FTP Connector 43, inbound workflow module 44, and an outbound workflow module 46. The Secure FTP Connector 43 receives the SFTP message with credential information, SSL, and authenticates the credential information of the interface manager 12. Once confirmed authenticated, the Information Power Center 42 assesses the content of the incoming information where the inbound workflow 44 determines how to proceed in processing the information as well as the outbound workflow 46 determines how to proceed in processing the outbound information. This might include storing the incoming information in the hub database 41 or sending the information to the outbound module 46 via SFTP. The Information Power Center includes Control-M functionality 30 for scheduling the batch processes for processing the information received.

The rule manager 16 includes Websphere® modules having a set of Java-based tools allowing users to create and manage specific web-based tools. In this case, the Websphere® module is working to manage the batch processing of the business rules associated with access to the data hub. The rules manager 16 includes a business rules orchestrator (BRO) 17 and a business rule management system (BRMS) 19. The BRO 17 includes a POJO module 34 under the Java EE 5 specification. The POJO programming model enables one to unit test outside of the application server, making the whole programming experience smoother.

The BRMS 19 is a software system used to define, deploy, execute, monitor and maintain the variety and complexity of decision logic that is used by operational systems within an organization or enterprise. This logic, also referred to as business rules, includes policies, requirements, and conditional statements that are used to determine the tactical actions that take place in applications and systems. The BRMS 19 includes a design time module 21 and a run-time module 23. The design-time module 21 includes tools allowing both technical developers and business experts to define and manage decision logic. The run-time module 23 includes a runtime environment, allowing applications to invoke decision logic managed within the BRMS 19 and execute it using a business rules engine.

The BRO 17 includes Spring Batch DAOs 32 used in scheduling and making calls to the data hub database 41. The Spring Batch DAOs 32 is an open source framework for batch processing. It is a lightweight, comprehensive solution designed to enable the development of robust batch applications, which are often found in modern enterprise systems. Spring Batch builds upon the POJO-based development approach of the commonly-known Spring Framework. Spring Batch provides reusable functions that are essential in processing large volumes of records, including logging/tracing, transaction management, job processing statistics, job restart, skip, and resource management. It also provides more advanced technical services and features that will enable extremely high-volume and high performance batch jobs though optimization and partitioning techniques. The control-M scripts module 13 of the BRO 17 includes scripts that tell the BRO 17 when to run specified batch handlers. These programs or scripts can be triggered at specified times or by specified kinds of occurrences, such as creation of a new log file. One can specify scheduled execution, starting the handler at fixed times of the day only, or metronomic execution, starting the handler repeatedly at a fixed interval.

The data hub database 41 includes an administration module 48 used for handling requests from the on-demand data providers 56. The Control M modules 30 communicate to manage the batch processing of requests to the data hub database 41. The data hub database 41 uses a batch monitor module 20. The administration module 48 includes managing and maintaining on-demand content to the data hub database 41. The batch monitor module 20 monitors the execution of the jobs being processed by the administration module 48. Also, the monitor module 20 might send information to the data hub database to determine the level of its utilization so as to schedule other pending jobs from the administration module 48.

This exemplary embodiment of the invention is platform independent and can execute in any browser such as Firefox®, Internet Explorer®, or Chrome®. All modules described herein can also be written in any platform independent-based computer language, such as Java or the like. The modules described herein execute on a client computer using a processor or the like. The modules described herein can be stored in the RAM or ROM of the client. The modules described herein can be stored in the RAM or ROM of the client. Furthermore, the modules described herein can be stored on an external memory device to be uploaded to the client computer for execution.

Although the present invention has been shown and described with respect to several preferred embodiments thereof, various changes, omissions and additions to the form and detail thereof, may be made therein, without departing from the spirit and scope of the invention.

What is claimed is:

1. A business rules batch processor executing on a processor comprising:
   a business rules manager executing on the processor that sends a plurality of pending requests to a rules database for processing; and
   a business rules orchestrator executing on the processor that receives statuses of the pending requests from the business rules manager, the business rules orchestrator manages the batch processing of the pending requests by assessing the rules database usage and job requirements of the pending requests, the business rules orchestrator defines, deploys, executes, monitors and maintains a plurality of decision logic that is used by operational systems within the enterprise system, the business rules orchestrator utilizes a plurality of scripts as defined by a script module to determine when to run specified batch handlers to assist in the batch processing, the batch handlers communicate with the rules database to assess the level of utilization of the batch processor so as to schedule the pending jobs, the script module coordinates with one or more external business rule managing systems to coordinate batch processing.

2. The business rules batch processor of claim 1, wherein the business rules manager comprises Control-M functionality.

3. The business rules batch processor of claim 1, wherein the business rules orchestrator comprises Control-M scripts for managing the batch processing of the pending requests.

4. The business rules batch processor of claim 1, wherein the business rules orchestrator comprises a plurality of Spring Batch Data Access Objects (DAOs) for scheduling and making calls to the data rules database.

5. The business rules batch processor of claim 4, wherein the business rules orchestrator comprises a Plain Old Java Object (POJO) module to enable the Spring Batch DAOs.

6. The business rules batch processor of claim 1, wherein the business rules orchestrator determines the usage of the rules database using a Control-M module.

7. The business rules batch processor of claim 1, wherein the business rules manager comprises a design time module to define and manage decision logic.

8. The business rules batch processor of claim 1, wherein the business rules manager comprises a run-time module having a runtime environment, allowing applications to invoke decision logic managed within the business rules manager.

9. A method for batch processing of business rules comprising:
   sending a plurality of pending requests from a business rules manger to a rules database for processing; and
   receiving statuses of the pending requests from the business rules manager to a business rules orchestrator, the business rules orchestrator manages the batch processing of the pending requests by assessing the rules database usage and job requirements of the pending requests, the business rules orchestrator defines, deploys, executes, monitors and maintains a plurality of decision logic that is used by operational systems within an organization or enterprise, the business rules orchestrator utilizes a plurality of scripts as defined by a script module to determine when to run specified batch handlers to assist in the batch processing, the batch handlers communicate with the rules database to assess the level of utilization of the batch processor so as to schedule the pending jobs, the script module coordinates with one or more external business rule managing systems to coordinate batch processing.

10. The method of claim 9, wherein the business rules manager comprises Control-M functionality.

11. The method of claim 9, wherein the business rules orchestrator comprises Control-M scripts for managing the batch processing of the pending requests.

12. The method of claim 9, wherein the business rules orchestrator comprises a plurality of Spring Batch Data Access Objects (DAOs) for scheduling and making calls to the data rules database.

13. The method of claim 12, wherein the business rules orchestrator comprise a Plain Old Java Object (POJO) module to enable the Spring Batch DAOs.

14. The method of claim 9, wherein the business rules orchestrator determines the usage of the rules database using a Control-M module.

15. The method of claim 9, wherein the business rules manager comprises a design time module to define and manage decision logic.

16. The method of claim 9, wherein the business rules manager comprises a run-time module having a runtime environment, allowing applications to invoke decision logic managed within the business rules manager.

* * * * *